US011721365B2

(12) United States Patent
Petty

(10) Patent No.: US 11,721,365 B2
(45) Date of Patent: Aug. 8, 2023

(54) VIDEO EDITING OR MEDIA MANAGEMENT SYSTEM

(71) Applicant: Blackmagic Design Pty Ltd, Port Melbourne (AU)

(72) Inventor: Grant Petty, Port Melbourne (AU)

(73) Assignee: Blackmagic Design Pty Ltd, Port Melbourne (AU)

(*) Notice: Subject to any disclaimer, the term of this patent is extended or adjusted under 35 U.S.C. 154(b) by 0 days.

(21) Appl. No.: 17/453,733

(22) Filed: Nov. 5, 2021

(65) Prior Publication Data
US 2022/0148621 A1  May 12, 2022

Related U.S. Application Data

(60) Provisional application No. 63/111,463, filed on Nov. 9, 2020.

(51) Int. Cl.
*G06F 3/0481* (2022.01)
*G11B 27/031* (2006.01)
*G06F 3/0484* (2022.01)

(52) U.S. Cl.
CPC .......... *G11B 27/031* (2013.01); *G06F 3/0481* (2013.01); *G06F 3/0484* (2013.01)

(58) Field of Classification Search
CPC ..... G11B 27/031; G11B 27/34; G06F 3/0481; G06F 3/0484; G06F 3/04855
See application file for complete search history.

(56) References Cited

U.S. PATENT DOCUMENTS

| | | |
|---|---|---|
| 5,519,828 A | 5/1996 | Rayner |
| 7,805,678 B1 | 9/2010 | Niles et al. |
| 8,126,312 B2 | 2/2012 | Bushell et al. |
| | (Continued) | |

FOREIGN PATENT DOCUMENTS

| | | |
|---|---|---|
| WO | 2007/082167 A2 | 7/2007 |
| WO | 2020/198793 A1 | 10/2020 |

OTHER PUBLICATIONS

Written Opinion of the International Searching Authority for Application No. PCT/AU2020/050320 dated Jun. 3, 2020, 4 pgs.
(Continued)

*Primary Examiner* — Jeanette J Parker
(74) *Attorney, Agent, or Firm* — Seed Intellectual Property Law Group LLP

(57) ABSTRACT

A software product includes a computer-readable medium storing instructions which, when executed by a processor, displays a graphical user interface for a video editing system, the graphical user interface including: a media bin displaying a plurality of media elements imported into the video editing system; a viewing window for viewing a selected one of the media elements; a timeline; a concatenator element; and a focus element; responsive to a user actuating the concatenator element, concatenates the media elements present in the media bin together into a single media element and loading the single media element into the viewing window; and responsive to a user actuating said focus element, modifies the single media element to form a focused single media element that concatenates only those media elements present in the media bin with related metadata and loading the focused single media element into the viewing window.

14 Claims, 10 Drawing Sheets

(56) References Cited

U.S. PATENT DOCUMENTS

| | | | |
|---|---|---|---|
| 8,156,176 B2 | 4/2012 | Lerman et al. | |
| 8,363,055 B1 | 1/2013 | Gregory et al. | |
| 8,819,557 B2 | 8/2014 | Matsuda et al. | |
| 8,966,367 B2 | 2/2015 | Meaney et al. | |
| 2002/0172498 A1 | 11/2002 | Esenyan et al. | |
| 2003/0142124 A1* | 7/2003 | Takata | G11B 27/28 |
| 2006/0224940 A1 | 10/2006 | Lee | |
| 2007/0162857 A1* | 7/2007 | Weber | G06F 8/30 |
| | | | 715/825 |
| 2008/0253735 A1 | 10/2008 | Kuspa et al. | |
| 2010/0281372 A1 | 11/2010 | Lyons et al. | |
| 2010/0281384 A1 | 11/2010 | Lyons et al. | |
| 2012/0206653 A1 | 8/2012 | Graves et al. | |
| 2012/0210219 A1 | 8/2012 | Agnoli et al. | |
| 2012/0210221 A1 | 8/2012 | Khan et al. | |
| 2013/0073964 A1 | 3/2013 | Meaney et al. | |
| 2013/0104042 A1* | 4/2013 | Meaney | G11B 27/34 |
| | | | 715/716 |
| 2013/0121668 A1 | 5/2013 | Meaney et al. | |
| 2013/0125000 A1* | 5/2013 | Fleischhauer | H04N 5/262 |
| | | | 715/723 |
| 2014/0143671 A1 | 5/2014 | Kovalick | |
| 2015/0243325 A1* | 8/2015 | Pacurariu | G11B 27/28 |
| | | | 386/280 |
| 2016/0225405 A1 | 8/2016 | Matias et al. | |
| 2018/0336931 A1 | 11/2018 | Tandon et al. | |
| 2018/0358049 A1 | 12/2018 | Latulipe et al. | |
| 2020/0174649 A1* | 6/2020 | Diu | G06F 3/04847 |

OTHER PUBLICATIONS

International Search Report for Application No. PCT/AU2020/050320 dated Jun. 3, 2020, 4 pgs.

Blackmagicdesign Reference Manual "DaVinci Resolve 14.3", Jan. 2018, 1346 pgs.

Blackmagicdesign Reference Manual "DaVinci Resolve 15", Aug. 2018, 2632 pgs.

Saccone, P. et al., Blackmagicdesign "The Definitive Guide to Davinci Resolve 15" 2019, 407 pgs.

Blackmagicdesign Reference Manual "DaVinci Resolve", Aug. 2020, 3590 pgs.

Extended European Search Report for EP Application No. 21207315.9, dated Apr. 8, 2022, 10 pgs.

Written Opinion of the International Searching Authority for Application No. PCT/AU2020/050322 dated Jun. 9, 2020, 7 pgs.

International Search Report for Application No. PCT/AU2020/050322 dated Jun. 9, 2020, 8 pgs.

International Search Report for Application No. PCT/AU2020/050795 dated Oct. 12, 2020, 7 pgs.

Written Opinion for International Search Report for Application No. PCT/AU2020/050795 dated Oct. 12, 2020, 4 pgs.

U.S. Appl. No. 17/600,966, filed Oct. 1, 2021.

U.S. Appl. No. 17/600,978, filed Oct. 1, 2021.

U.S. Appl. No. 17/632,163, filed Feb. 1, 2022.

Sengstack, J. "Edit sequences in the Premiere Pro Source Monitor into other sequences", Mar. 18, 2013, 6 pages.

Blackmagic Design "Blackmagic Design Announces DaVinci Resolve 16", Apr. 8, 2019, 2 pages.

Extended European Search Report for EP Application No. 20781753.7 dated Nov. 25, 2022, 10 pages.

\* cited by examiner

VIDEO EDITING OR MEDIA MANAGEMENT SYSTEM

BACKGROUND

Field

The present disclosure relates generally to video editing software applications. More specifically, the present disclosure relates to a media management system for video editing software applications that, at least in preferred embodiments, provides users with a more efficient workflow environment.

Description of the Related Art

Film and/or video productions are created on video editing systems typically by assembling the project from a collection of constituent elements. Video editing systems allow these constituent elements—which include video clips, audiovisual clips, audio clips and associated metadata—to be separately imported and edited before being merged into the final production. Modern video editing systems (and particularly those used professionally in the film and television industry) include sophisticated video editing software applications. The video editing system known as DaVinci Resolve® is an example of a modern video editing system that is extensively used in the professional environment. The total functionality of DaVinci Resolve® is divided into a number of separate pages (each having their own graphical user interface) that are organized in the order of a typical workflow. The DaVinci Resolve® pages include: Media (for media management and clip organization); Edit (a non-linear video editor); Cut (an alternative non-linear video editor); Color (for color correction and grading); Sound (a digital audio workstation); Delivery (for final rendering or output); and Fusion (for applying video effects).

In common with other non-linear video editors, the user interface of the Edit and Cut pages of DaVinci Resolve® includes a timeline that is a graphical representation of the project being edited. The timeline includes a plurality of linearly spaced timecode markings that extend typically in a horizontal direction along the length of the user interface window. The timeline allows the constituent elements of the project to be arranged into the desired temporal order by alignment with the timeline's temporal markings. Once placed in the timeline, elements can be edited by launching editing tools to perform operations such as trimming, splitting, inserting, merging, and moving of clips to a desired location.

The present disclosure aims to provide a video editing system that, at least in preferred embodiments, provides users with a more optimized video editing workflow environment

BRIEF SUMMARY

According to one aspect of the present disclosure there is provided a software product including a non-transitory computer-readable medium storing instructions which when executed by a processor:
displays a graphical user interface for a video editing system, the user interface including:
a media bin displaying a plurality of media elements imported into the video editing system;
a viewing window for viewing a selected one of the media elements;
a timeline;
a concatenator element; and
a focus element;
responsive to a user actuating the concatenator element, concatenates the media elements present in the media bin together into a single media element and loads the single media element into the viewing window; and
responsive to a user actuating said focus element, modifies the single media element to form a focused single media element that concatenates only those media elements present in the media bin with related metadata and loads the focused single media element into the viewing window.

According to at least one embodiment, the user interface further includes a sort element and, responsive to a user actuating said sort element, the media elements in the media bin are displayed according to a predetermined sorting scheme. In at least one embodiment, the predetermined sorting scheme is user defined or user selected. The predetermined sorting scheme comprises sorting the media elements according to one or a combination of predefined metadata fields.

According to at least one embodiment, the focused single media element concatenates only those media elements present in the media bin that share attributes defined by the related metadata. The related metadata can include common metadata, similar metadata, or metadata within a defined range of values. In some embodiments the focused single media element concatenates only those media elements present in the media bin that share attributes defined by the one or a combination of predefined metadata fields corresponding to a currently-applied sorting scheme.

The predefined metadata field or fields can include one or more of: Timecode; Camera or camera type on which media was captured; Date; Time; Clip name; Scene; Shot; Clip color; Date modified; Date imported; and/or Bin.

In some embodiments, the focused single media element concatenates only those media elements present in the media bin that share related metadata with a selected one of the media elements displayed in the viewing window.

In some embodiments, the concatenator element and focus element comprise different modes of operation of a context sensitive user interface element. In at least one example, the context sensitive user interface element operates as the concatenator element in a first context, and operates as the focus element in a second context. The second context can arise once the single media element has been formed by concatenation of the media elements present in the media bin.

In some embodiments the context sensitive user interface element can also operates as a reversion element in a third context. The reversion element operates to reverse the operation of the focus element such that a single media element is again formed which is a concatenation of all of the media elements present in the media bin, and to load the single media element into the viewing window.

In any of the above embodiments, the display of media elements in the media bin that do not form part of the focused single media element can be hidden or de-emphasized (e.g., by greying, darkening, fading, re-coloring, blurring or the like).

In any of the above embodiments, the display of those media elements that form part of the focused single media element can be emphasized in the media bin display.

According to at least one embodiment, the speed of playback of the single media element is varied by reference to a property of the media elements comprising the single media element. For example, the property may be the durations of the single media elements. According to this embodiment, the playback speed of media elements of a duration above a threshold value can be increased.

Preferably, the instructions, responsive to a user input, insert one of the media elements, a selected portion of one or more of the media elements or into the timeline. This inserted media element is usually the media element that corresponds to the part of the single media element currently being viewed in the viewing window.

The graphical user interface may further include a defining object that is configured, responsive to a user input, to:
  define a start point and an end point for a media element being viewed in the viewing window;
  create a media element from the defined start and end points; and
  insert the created media element into the timeline.

According to another aspect of the present disclosure, there is provided a method for providing a graphical user interface for a video editing system, the method comprising:
  displaying a graphical user interface including:
    a media bin displaying a plurality of media elements imported into the video editing system;
    a viewing window for viewing a selected one of the media elements;
    a timeline;
    a concatenator element; and
    a focus element;
  responsive to a user actuating the concatenator element, concatenating the media elements present in the media bin together into a single media element and loading the single media element into the viewing window; and
  responsive to a user actuating said focus element, modifying the single media element to form a focused single media element that concatenates only those media elements present in the media bin with related metadata and loading the focused single media element into the viewing window.

When actuated the concatenator element concatenates the full media elements present in the media bin into the single media element. That is, if a media element in the media bin is a video clip (which may or may not include an audio track) the full length video clip is included in the single media clip by said concatenation. If a media element is a still image it may be concatenated into the single media element as a single frame or a sequence of multiple frames lasting a predetermined or user selectable length of time.

According to at least one embodiment, the user interface further includes a sort element and, the method includes, responsive to a user actuating said sort element, displaying the media elements in the media bin ordered according to a predetermined sorting scheme. In at least one embodiment, the predetermined sorting scheme is user defined or user selected. The predetermined sorting scheme can comprise sorting the media elements according to one or a combination of predefined metadata fields.

According to at least one embodiment, the method includes concatenating only those media elements present in the media bin that share attributes defined by the related metadata when the focus element is actuated. The related metadata can include common metadata, similar metadata, or metadata within a defined range of values. In some embodiments the focused single media element concatenates only those media elements present in the media bin that share attributes defined by the one or a combination of predefined metadata fields corresponding to a currently applied sorting scheme.

The predefined metadata field or fields can include one or more of: Timecode; Camera or camera type on which media was captured; Date; Time; Clip name; Scene; Shot; Clip color; Date modified; Date imported; and/or Bin.

In some embodiments, the focused single media element concatenates only those media elements present in the media bin that share related metadata with a selected one of the media elements displayed in the viewing window.

In some embodiments, the concatenator element and focus element comprise different modes of operation of a context sensitive user interface element. In one example, the context sensitive user interface element operates as the concatenator element in a first context, and operates as the focus element in a second context. The second context can arise once the single media element has been formed by concatenation of the media elements present in the media bin.

In some embodiments the context sensitive user interface element can also operate as a reversion element in a third context. The reversion element operates to reverse the operation of the focus element such that a single media element is again formed which is a concatenation of all of the media elements present in the media bin, and to load the single media element into the viewing window.

In any of the above embodiments the method can include de-emphasizing or hiding the display of the media elements in the media bin that do not form part of the focused single media element.

In any of the above embodiments the method can include emphasizing, in the media bin, those media elements that form part of the focused single media element.

According to at least one embodiment, the speed of playback of the single media element is varied by reference to a property of the individual media elements comprising the single media element. This can be the duration of the single media elements. In addition, the playback speed of media elements of a duration above a threshold value can be increased.

In some embodiments, the method includes, responsive to a user input, inserting one of the media elements into the timeline. This inserted media element can be the media element that corresponds to the part of the single media element currently being viewed in the viewing window.

The graphical user interface can further include a defining object that is configured, responsive to a user input, to:
  define a start point and an end point for a media element being viewed in the viewing window, wherein the media element is the single media element or focused single media element and wherein the start and end points may be in different ones of the media elements present in the media bin;
  create a media element from the defined start and end points, said media element including all media between the defined start and end points; and
  insert the created media element into the timeline.

According to another aspect of the present disclosure, a method includes displaying a graphical user interface for a video editing system, including:
  displaying a media bin including a first plurality of media elements; and
  displaying a concatenation of the first plurality of media elements in a viewing window; and then
  responsive to a user action initiating a focus function, displaying a concatenation of a second plurality of the media elements in the viewing window, wherein the second plurality of the media elements comprise only those media elements present in the media bin with related metadata.

In some embodiments, the method further includes, responsive to the user action initiating the focus function, displaying only the second plurality of media elements in the media bin.

According to another aspect of the present disclosure, a method includes displaying a graphical user interface for a video editing system, including:

displaying a sort element;

responsive to a user actuating the sort element, displaying the media elements ordered according to a predetermined sorting scheme; and responsive to a user action, displaying a focused single media element that concatenates those media elements related by the sorting scheme.

In some embodiments the predetermined sorting scheme sorts based on certain metadata of the media elements, for example according to any metadata described herein. The focused single media element may concatenate media elements based on them sharing the certain metadata attributes.

As used herein, except where the context requires otherwise, the term "comprise" and variations of the term, such as "comprising," "comprises," and "comprised," are not intended to exclude further additives, components, integers, or steps.

BRIEF DESCRIPTION OF THE SEVERAL VIEWS OF THE DRAWINGS

Further aspects of the present disclosure and further embodiments of the aspects described in the preceding paragraphs will become apparent from the following description, given by way of example and with reference to the accompanying drawings, in which.

DETAILED DESCRIPTION

Figure 1:
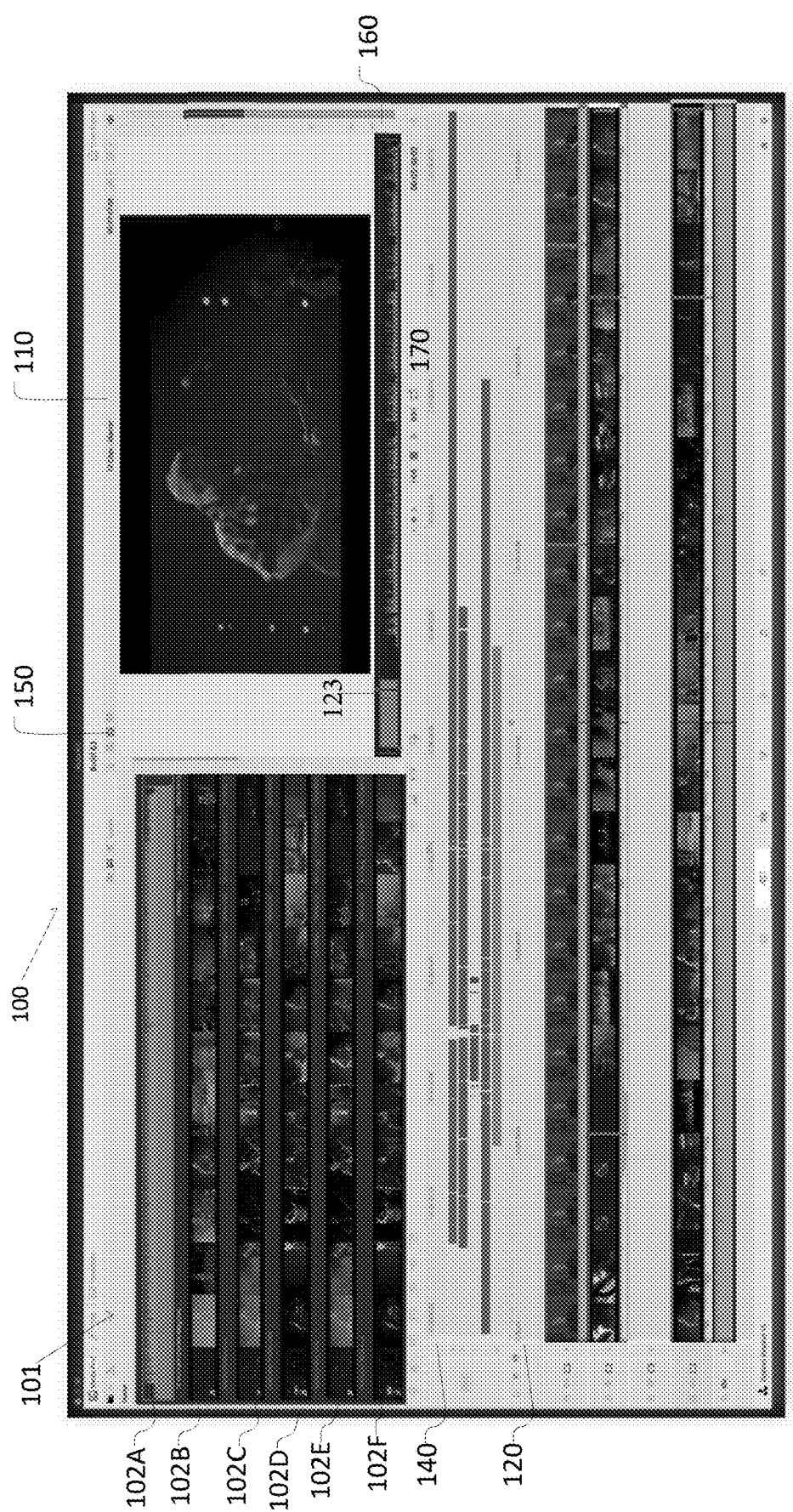
FIG. 1 is an illustration of a first view of a user interface according to an embodiment.

A user interface 100 for a video editing software application is shown in FIG. 1. The video editing software allows for the creation of projects from constituent media elements that are imported into the video editing software application and displayed in a media bin area 101 for example as described in the Applicant's co-pending international patent application PCT/AU2020/050322, the contents of which are incorporated by reference herein. In the illustrated embodiment, there is a single bin of media elements named 'Master,' however those skilled in the art will realize that any number of media bins can be created and media elements placed therein to provide a framework for organizing the project.

In the illustrated embodiment, the user has imported twelve constituent media elements in the project, six of which are shown in FIG. 1. The remaining media elements can be made viewable by operating the scroll bar located on the right hand side of the media bin area 101. The six visible constituent elements comprise an audio track 102A and five audio-visual clips 102B-102F (namely video clips, each with a recorded audio track). As understood by skilled users, the video editing software application also stores and manages metadata for each constituent media element, as well as for the overall project.

User interface 100 also includes a viewer window 110 for viewing a selected video or audio-visual clip, a first timeline 120, and second timeline 140 lying parallel and above first timeline 120. The operation of the two timelines is described in the Applicant's co-pending international patent application PCT/AU2020/050320, the contents of which are incorporated herein.

Timelines 120 and 140 allows users to create projects by inserting constituent media elements into the timelines and performing editing and arrangement operations. In this regard, the individual source media elements 102B-102F can be dragged or otherwise inserted into one of the timelines 120, 140 from media bin area 101 or viewer window 110. Once in a timeline, the constituent media elements can be suitably edited and arranged.

User interface 100 is streamlined by only displaying a subset of the usual user interface elements that are displayed on the Cut page of DaVinci Resolve®. For example, user interface 100 does not include a separate viewer window for viewing video and audio-visual clips in the media bin area 101. The streamlined user interface displays the core tools that are needed for certain projects, for example to import media, edit, trim, add transitions and titles, automatically match color, and mix audio.

Although only six constituent media elements are illustrated, it is not unusual for dozens or even hundreds of constituent media elements to be imported for potential use in a project. This can lead to difficulties in locating the desired clip from within all of the files present in the media bin area 101.

To address this issue, user interface 100 further includes a concatenator object, which in the example of FIG. 1 is in the form of a button 150. Button 150 can be suitably actuated by a user, typically in a single action such as by clicking with a mouse or other pointer device, or performing a suitable gesture on a touchscreen, or by entering a keyboard shortcut linked to the button. In response to actuating the concatenator object, user interface 100 concatenates each of the media elements present in the media bin area 101 into a single media element and loads the created single media element into the viewer window 110. The user interface 100 displays the total number of media elements comprised in the single media element (in this case 12) and displays the name of the media bin that contains the media element currently being viewed in the viewer window 110 (in this case 'Master'). In the particular example shown, the display of the total number of media elements and the name of the media bin are combined into a single item of display, which in this case is "12 Clips—Master" displayed in a header of the viewer window 110. The total length of the single media element is also displayed in the user interface 100. In the illustrated embodiment, the element number, media bin identifier, and length are displayed in the area above the viewer window; however, this data could readily be displayed in other locations of the user interface 100.

When there are multiple bins created and displayed in the media bin area 101, the concatenation action can be performed to produce a single media element from the media elements present in a selected one of the bins, or from the content of multiple bins. In a preferred form actuation of the concatenator element 150 causes the whole of each of the media elements in the (selected or all) media bin(s) 101 to be concatenated into the single media element.

A graphical display object 160 is located underneath viewer window 110. In the illustrated embodiment, the entire single media element is depicted in graphical display object 160 including an audio waveform. In this depiction, users can easily identify particular clips, for example by inspecting the trough regions of the audio waveform, which indicate clips with low or zero volume.

The graphical display object 160 appears as a strip representing the concatenation of its constituent elements. The boundaries between the constituent media elements are indicated in graphical display object 160 by vertical lines of a contrasting color (such as white).

Other depictions of the single media element in the graphical display object 160 can also be used, such as schematically illustrating the constituent media elements using simple geometric shapes such as rectangles. The constituent media elements can be distinguished in graphical display object 160, for example by using different colors for the schematic illustrations.

Having a single media element comprised of all of the media elements present in the media bin area allows the user to scrub through the single media element (at high speed if necessary) and easily locate the required constituent media element. High-speed scrubbing can be performed by manipulating a playhead 123, located in graphical display object 160. Other operations (including high-speed scrubbing) can be performed using viewer window controls 170 that are, in the embodiment shown in FIG. 1, located below graphical display object 160.

Once located, the required media element can readily be inserted into one of the timelines 120 and 140, such as by dragging and dropping from the viewer window 110 or from graphical display object 160. The user interface 100 is configured to only insert into the timeline the individual media element currently being viewed in the viewer window 110, rather than inserting the entire single media element.

The order of the constituent media elements within the created single media elements corresponds with the ordering of the constituent media elements in the originating media bin. However, the ordering of the individual source media elements within the created single media element can also be defined by the user and need not follow the ordering of the media elements within a media bin.

Graphical display object 160 is configured to receive user input (such as a keyboard input, mouse click, or touch-screen display contact) and in response thereto, define start points and/or end points within the single media element while it is in the process of being played in the viewer window 110. Any new clips that are defined in this way (namely by the definition of a start point and a corresponding end point) are automatically loaded into one or both of the timelines 120 and 140. In the graphical display object 160, a plurality of start points and/or end points can be defined to add multiple clips defined by pairs of start and end points into the timelines 120 and 140. By presenting a concatenation of all the constituent media objects into a single media element and allowing multiple clips to be thus defined, the user workflow can be improved as it is no longer necessary to load individual clips into the timeline.

Once the multiple clips are present in the timelines 120 and 140, the boundaries thereof can be suitably edited, such as by trimming and/or extending. This functionality allows use of the graphical display object 160 to create clips with approximate boundaries, which can then be refined using the editing tools of the timelines.

Figure 2:
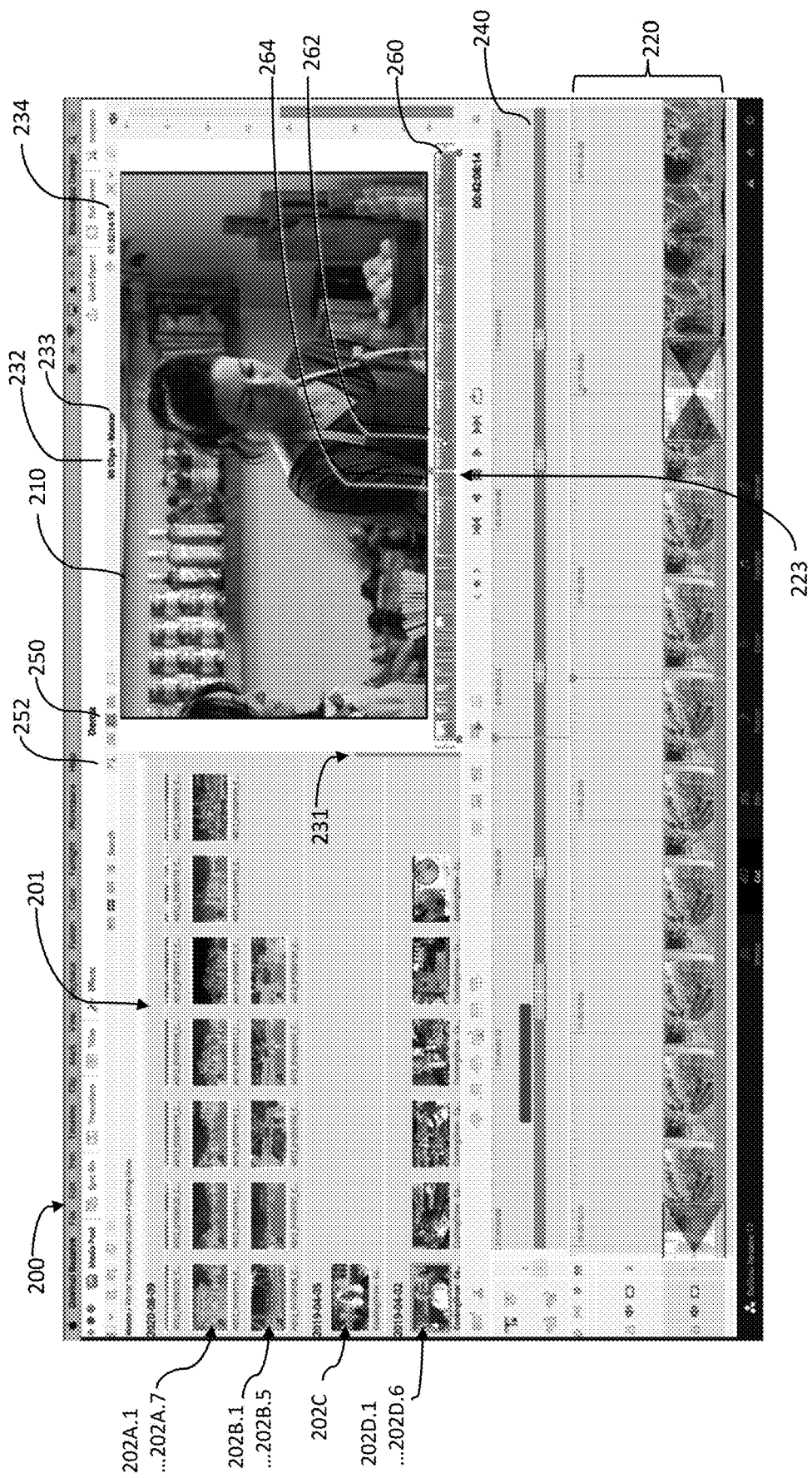
FIG. 2 is an illustration of a first view of a second user interface according to an embodiment.
Figure 4:
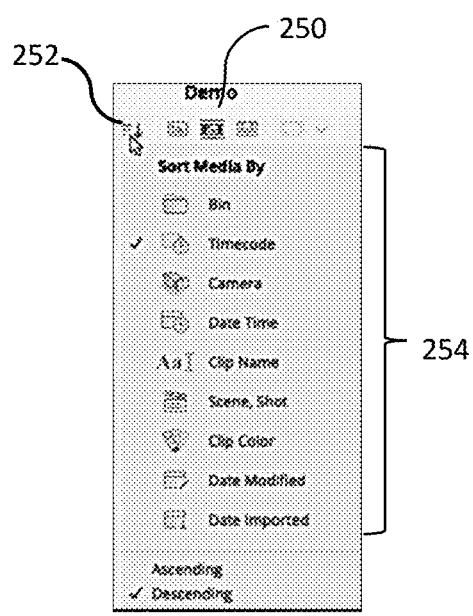
FIG. 4 is an illustration of a sort element of a second user interface according to an embodiment.
Figure 5:
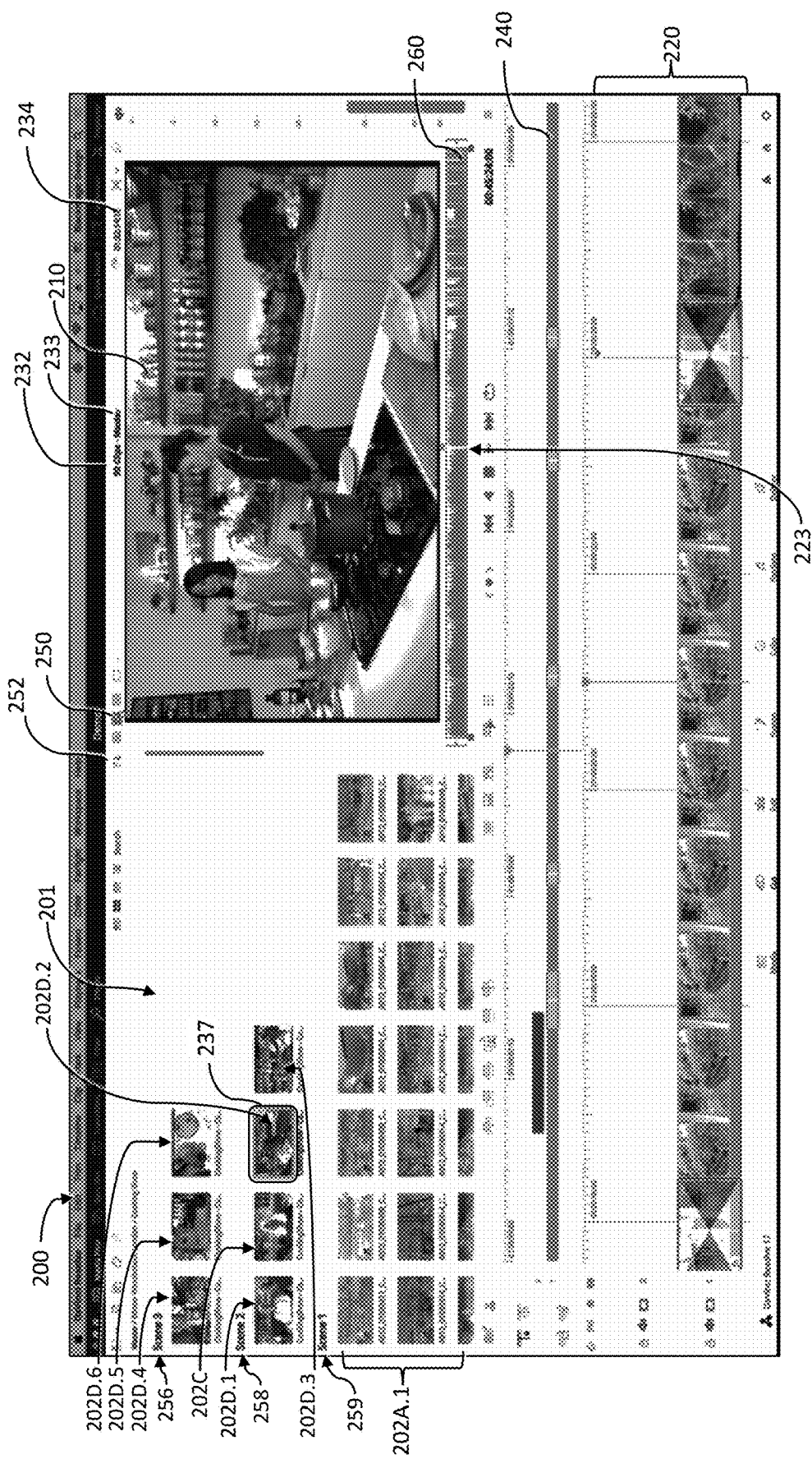
FIG. 5 is an illustration of a third view of a second user interface according to an embodiment.
Figure 6:
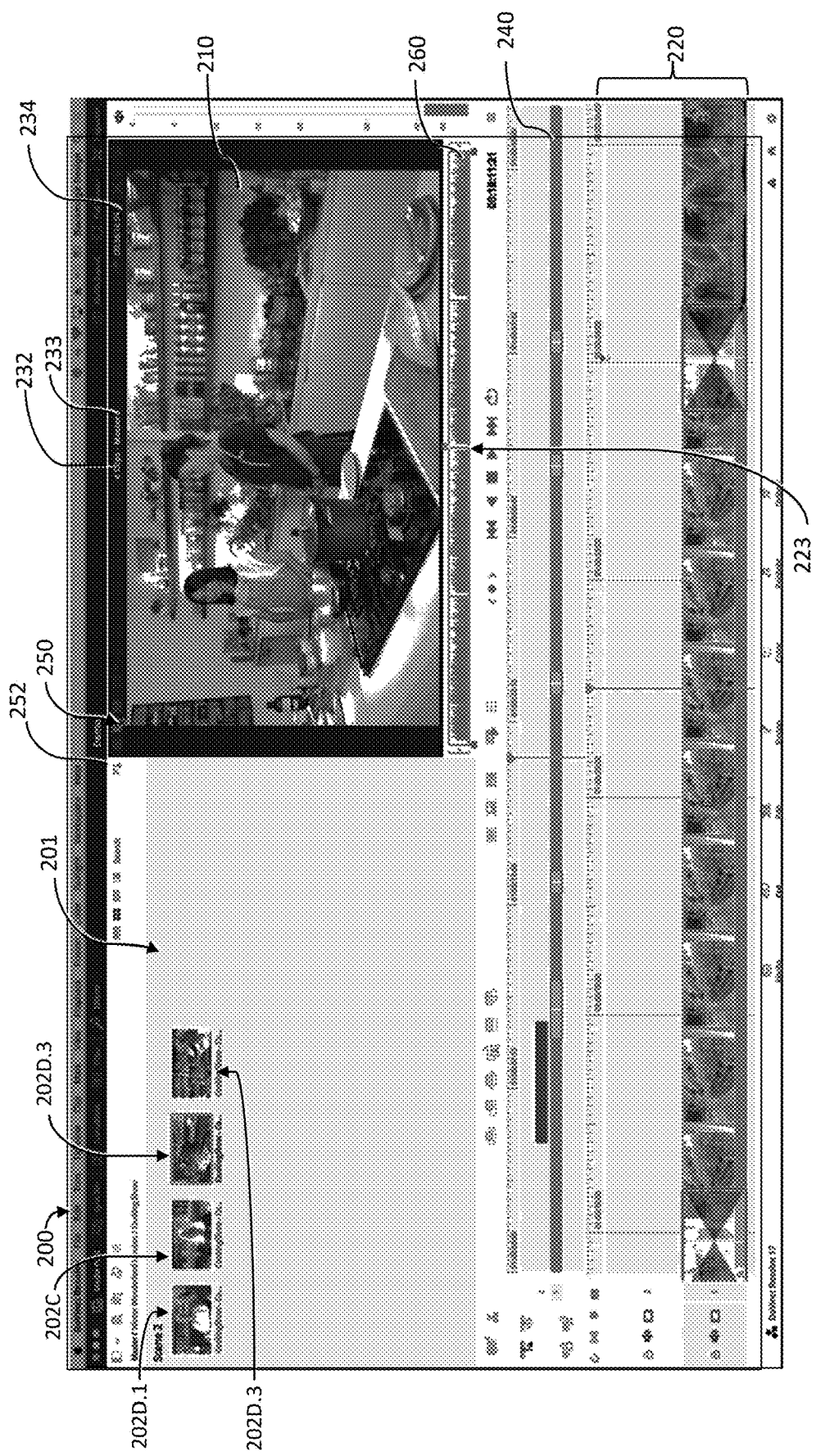
FIG. 6 is an illustration of a fourth view of a second user interface according to an embodiment.

The concatenation of a plurality of media elements into a single media element effectively removes the start and end points that the individual elements inherently defined prior to the concatenation operation. This opens up the possibility of creating new media elements (namely by defining start and end points in the created single media element) that contain content from more than one of the original source media elements. Transition effects can then be readily inserted between the newly-created media elements. FIGS. 2 to 6 illustrate a further embodiment of a user interface 200 for a video editing software application, such as a non-linear editor. The embodiment of FIGS. 2 and 6 is similar to that of FIG. 1, and common elements from FIG. 1 having reference numerals between 100 and 170 have been numbered with numerals ranging from 200 to 270 such that an element in FIG. 1 with reference numeral 1XX will be illustrated with reference numeral 2XX in FIGS. 2 to 6—such corresponding elements have the same function in each embodiment, unless otherwise noted.

Turning to FIG. 2, the video editing software allows for the creation of projects from constituent media elements that are imported into the video editing software application and displayed in a media bin area 201. In the illustrated embodiment, there is a single bin of media elements named 'Master,' however those skilled in the art will realize that any number of media bins can be created and media elements placed therein to provide a framework for organizing the project.

Figure 3:
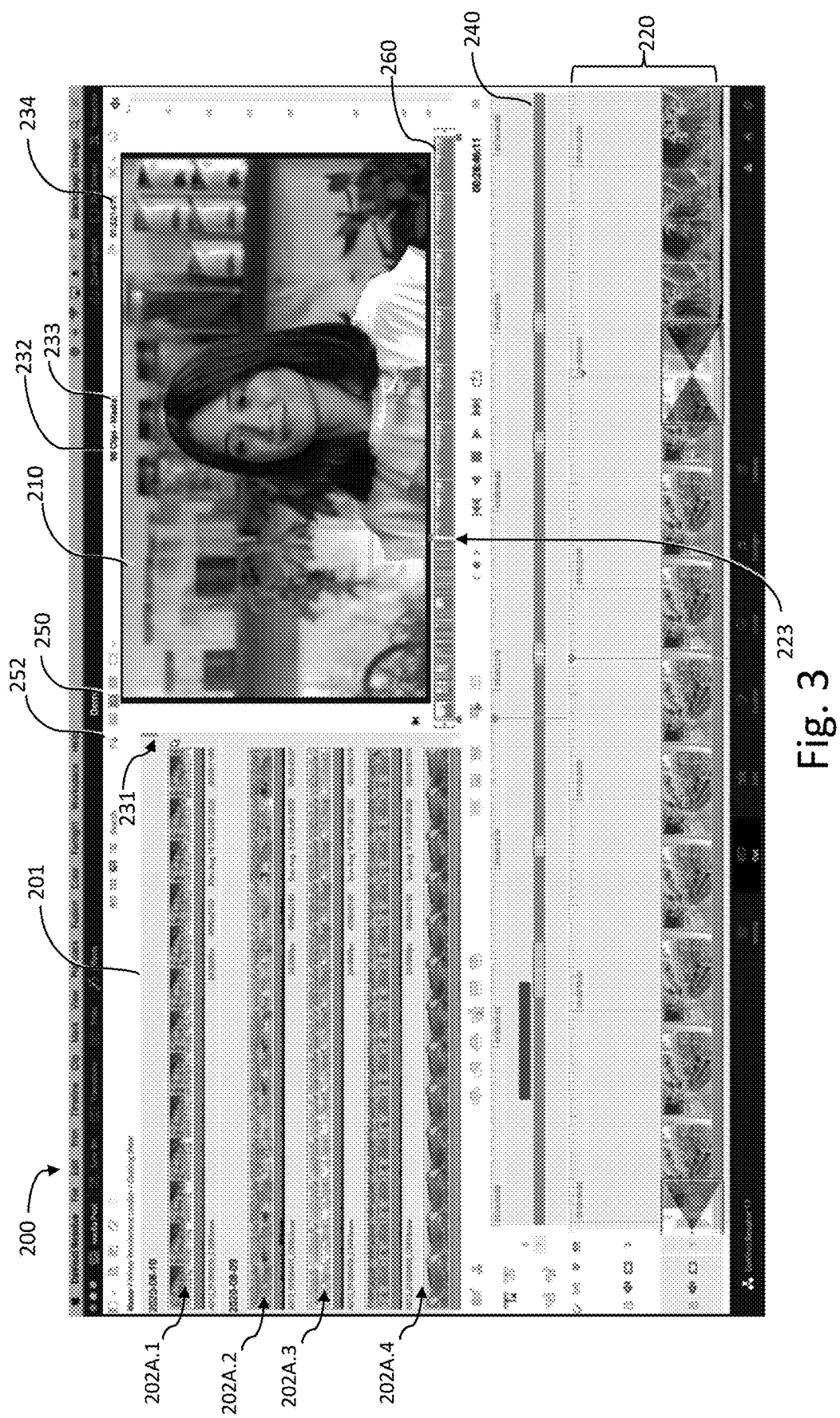
FIG. 3 is an illustration of a second view of a second user interface according to an embodiment.

In the illustrated embodiment, the user has imported 90 constituent media elements in the project, 19 of which are shown in FIG. 1. The remaining media elements can be made viewable by operating the scroll bar 231 located on the right-hand side of the media bin area 201. The 19 visible constituent media elements comprise seven audio-visual clips 202A.1 to 202A.7 represented by icons in a first row, five audio-visual clips 202B.1 to 202B.5 represented by icons in a second row, audio-visual clips 202C represented by an icon in the third row, and six audio-visual clips 202D.1 to 202D.6 represented by icons in a fourth row. As understood by skilled users, the video editing software application also stores and manages metadata for each constituent element, as well as for the overall project. FIG. 3 shows a second view of the interface with the media elements visible as clips or film strips. Other views of the clips (e.g., as a list, folder) are also possible.

User interface 200 also includes a viewer window 210 for viewing a selected video or audio-visual clip, a first timeline 220, and second timeline 240 lying parallel and above first timeline 220. The operation of the two timelines is described in the Applicant's co-pending PCT patent application PCT/AU2020/050320, the contents of which are incorporated herein.

Timelines 220 and 240 allows users to create projects by inserting constituent media elements into either of the timelines and performing editing and arrangement operations.

Insertion of a media element into either one of the timelines 220, 240 causes the same media element to be displayed in a corresponding position in the other of the timelines. In this regard, the individual source media elements 202A.1 . . . 202A.4 (or any of the extra media elements present in the media bin, but not visible in the present view) can be dragged or otherwise inserted into one of the timelines 220 or 240 from media bin area 201 or viewer window 210. Once in a timeline, the constituent media elements can be suitably edited and arranged.

User interface 200 is streamlined by only displaying a subset of the usual user interface elements that are displayed on the Cut page of DaVinci Resolve®. For example, user interface 200 does not include a separate viewer window for viewing video and audio-visual clips in the media bin area 201. The streamlined user interface displays the core tools that are needed for certain projects, for example to import media, edit, trim, add transitions and titles, automatically match color, and mix audio.

Although only 19 constituent media elements are illustrated in FIG. 2, the present example has 90 clips loaded in the bin. However, it is not unusual for hundreds of constituent media elements to be imported for potential use in a project. This can lead to difficulties in locating and managing the desired clip(s) from within all of the files present in the media bin area 201, even when using a concatenator element as described in connection with FIG. 1. Accordingly, the present embodiment presents an enhanced mechanism for locating and managing media.

The present user interface 200 further includes a concatenator object, which in the example of FIG. 2 is in the form of a button 250. Button 250 can be suitably actuated by a user, typically in a single action such as by clicking with a mouse or other pointer device, or performing a suitable gesture on a touchscreen, or by entering a keyboard shortcut linked to the button. In response to actuating the concatenator object, user interface 200 concatenates each of the media elements present in media bin area 201 into a single media element and loads the created media element into the viewer window 210. The user interface 200 displays the total number of media elements (232) comprised in the single media element (234) and the media bin name (233) of the media bin that contains the media element currently being viewed in the viewer window 210 (in this case 'Master'). The total length of the single media element (234) is also displayed in the user interface 200. In the illustrated embodiment, the media element count (232), media bin name or identifier (233), and length of the single media element (234) formed by concatenation, are displayed in the area above the viewer window; however, this data could readily be displayed in other locations of the user interface 200.

When there are multiple bins created and displayed in the media bin area 201, the concatenation action can be performed to produce a single media element from the media elements present in a selected one of the bins, or from the content of multiple bins.

As in FIG. 1, a graphical display object 260 is located underneath viewer window 210. In the illustrated embodiment, the entire single media element is depicted in graphical display object 260 including an audio waveform. In this depiction, users can easily identify particular clips, for example by inspecting the trough regions of the audio waveform, which indicate clips with low or zero volume. The temporal boundaries (i.e., edges) of the constituent media elements are indicated in graphical display object 260 by vertical lines, e.g., 262 and 264 of a contrasting color (such as white) to aid a user in determining the length of the constituent media element relative to the length of the entire single media object.

Other depictions of the single media element can also be used, such as schematically illustrating the constituent media elements using simple geometric shapes such as rectangles. The constituent media elements can be distinguished in graphical display object 260 for example by using different colors for the schematic illustrations.

Having a single media element comprised of all of the media elements present in the media bin area allows the user to scrub through the single media element (at high speed if necessary) and easily locate the required constituent media element. High-speed scrubbing can be performed by manipulating a playhead 223, located in graphical display object 260. Other operations (including high-speed scrubbing) can be performed using viewer window controls 270 that are located below graphical display object 260.

The order of the constituent media elements within the created single media elements corresponds with the ordering of the constituent media elements in the originating media bin. However, the ordering of the individual source media elements within the created single media element can also be defined by the user and need not follow the ordering of the elements within a media bin. In the present embodiment, the media elements 202A.1 to 202D.6 are shown in the media bin 201 sorted by date of import. The media elements are arranged in groups by date of import. In order to set this sorting, the user interface according to this embodiment, includes a sort element 252. When actuated, the sort element 252 causes the media elements in the media bin 201 to be displayed in an order according to a predetermined sorting scheme. The sorting scheme can be user defined or user selected. FIG. 4 illustrates an example sort element. This sort element 252 is actuated by selecting an interface button and then the user selecting the sorting scheme to be used. The sorting scheme can comprise sorting the media elements according to one or a combination of predefined metadata fields. A list of possible metadata fields is illustrated in the sort scheme list 254 of FIG. 4. Once a sort scheme is selected the order of the media elements in the bin is shown in the new sort order. The display of the bin can also group media elements according to the appropriate metadata for the sorting scheme. In this regard, FIG. 5 illustrates the media elements illustrated in the embodiment of FIGS. 2 and 3 sorted by scene name. A first group of media elements 202D.4, 202D.5 and 202D.6 are grouped as part of "Scene 3" 256 as they share metadata reflecting that they relate to this scene. A second group of media elements 202C, 202D.1, 202D.2 and 202D.3 are grouped as part of "Scene 2" 258 as they share metadata reflecting that they relate to this scene. A third group of media elements 202A.1 are grouped as belonging to "Scene 1" 259 as they share metadata reflecting that they relate to this scene.

As will be appreciated, media elements can be stored in data or file formats containing a range of different metadata fields, and any one or more metadata fields can be used for sorting the media elements. The grouping in the display can be performed based on matching metadata in a field or fields set by the sorting scheme, or metadata falling within a range of values in one or more metadata fields set by the sorting scheme. Convenient metadata fields can include one or more of: Timecode; Camera or camera type on which media was captured; Date; Time; Clip name; Scene; Shot; Clip color; Date modified; Date imported; and/or Bin.

Returning to FIG. 5, as can be seen the media elements in the media bin 201 are grouped differently than the grouping of FIGS. 2 and 3. This allows a user to see the grouping of media elements that they find most useful for their editing workflow and task. However, when working with a multitude of media elements this can still be difficult. In this embodiment, the user interface 200 also includes a focus element which can be used to reduce the current set of media elements that the user is working with at any one time, which may simplify and speed up operation. The focus element is used to reduce the number of elements in the group of media elements that form the single media element. In this embodiment, this involves only concatenating those media elements in the media bin that share certain metadata attributes into a modified single media element, that can be displayed as described above.

The grouping of clips can be defined based on the clip currently displayed in the viewer window 210 and its associated metadata. For example, all media elements with metadata related to the presently displayed media element can be included in the focused single media element. The related metadata can include common metadata, similar metadata, or metadata within a defined range of values. In some embodiments, the focused single media element concatenates only those media elements present in the media bin that are grouped together by the presently active sorting scheme.

Thus, in FIG. 5, media element 202D.2 is actively displayed in the viewer window 210 (this can be seen by the pronounced outline 237 in the interface around the icon of media element 202D.2 in the media bin 201). When the user activates the focus element (button) 250, the single media element is modified, and the user interface is transitioned to the view of FIG. 6.

Figure 5B:
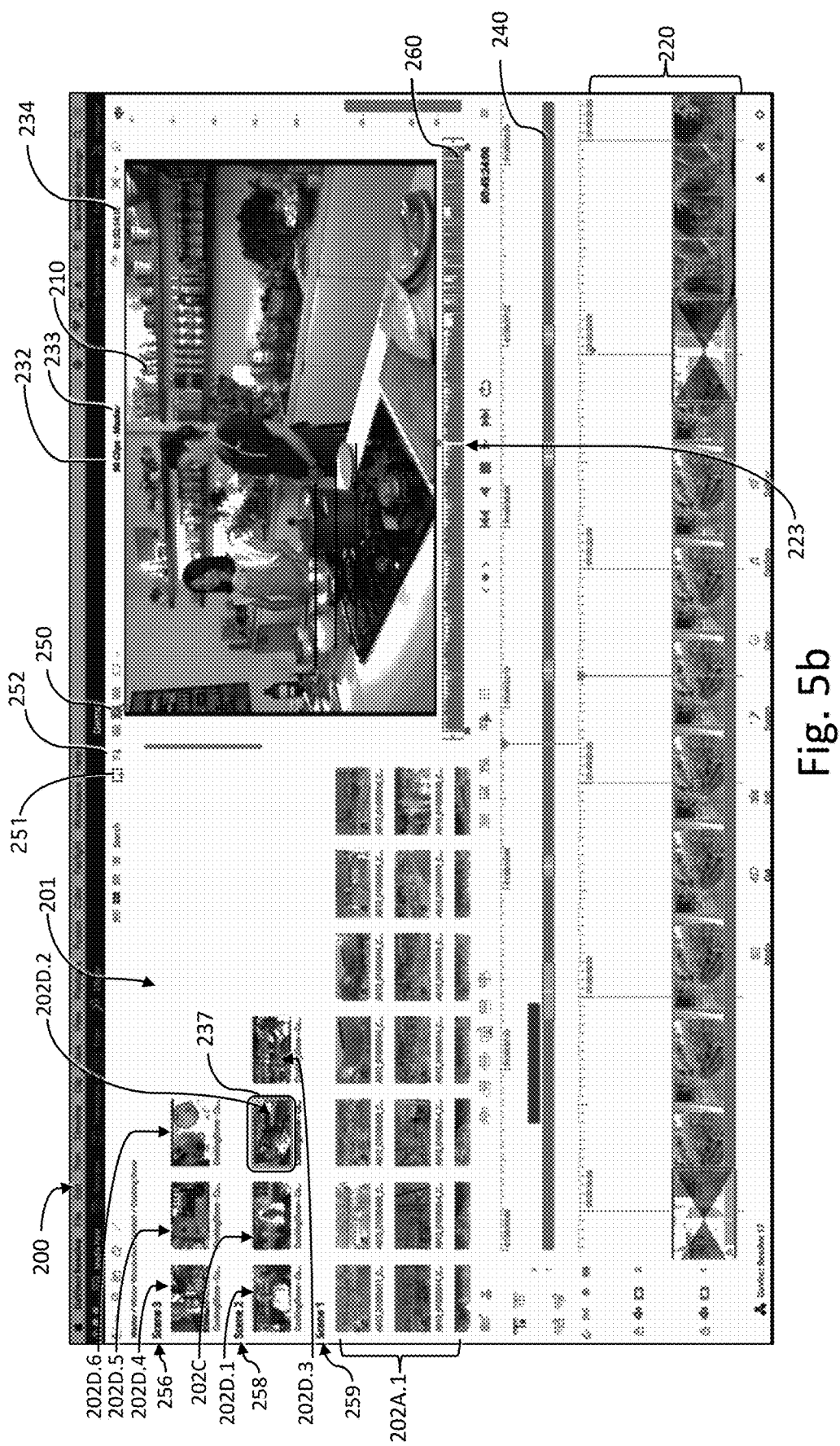
FIG. 5b is an illustration of a corresponding view of a user interface according to a variation of the embodiment of FIG. 5.

In other examples the concatenator element and the focus element are distinct. For example, the button 250 may be a dedicated concatenator element and another button may operate as the focus element. FIG. 5b provides an illustration of such a user interface 200. The user interface of FIG. 5b only differs from the embodiment of FIG. 5 in that the user interface 200 of FIG. 5b includes a dedicated focus element in the form of a button 251. All other elements are as for FIG. 5 and share reference numerals therewith. The focus element, button 251, can be suitably actuated by a user, typically in a single action such as by clicking with a mouse or other pointer device, or performing a suitable gesture on a touchscreen, or by entering a keyboard shortcut linked to the button. Upon actuation of the focus element 251 the single media element is modified, as noted in relation the operation of the focus element in FIG. 5, and the user interface is transitioned to the view of FIG. 6. The user interface of FIG. 6 (and also FIGS. 2 to 4) may also be adapted to include a dedicated focus element, for example, as per FIG. 5b.

As can be seen in FIG. 6, the modified single media element (graphical display object) illustrated at 260 only includes four clips. In addition, in the embodiment shown in FIG. 6, the media bin 201 is modified. In particular, the only clips remaining visible in the media bin 201 are the four clips included in the modified single media element illustrated at 260. In this example, the four remaining clips share the "Scene 2" metadata with clip 202D.2. The new, modified single media element, called the focused single media element, can be used as described above.

In the example of FIG. 5, the concatenator element and focus element are activated by use of the same visual element, button 250, on the user interface. This button 250 operates in a context sensitive manner in which the button operates as the concatenator element in a first context (in this case when the "source tape" bin mode is inactive—i.e., no single media element is active) and operates as the focus element in a second context (in this case when the "source tape" mode is active—i.e., a single media element is active).

The user interface 200 of any of the above embodiments can include a reversion element, whereby if a focused single media element is active, responsive to a user actuating said reversion element, the single media element again includes all media elements present in the media bin and loads the single media element into the viewing window. That is, actuation of the reversion element undoes the action of the focus element, and returns the interface to the first context, in which the single media element includes all media elements in the active bin (e.g. the state of FIGS. 2 and 3). The reversion element can be a physical or GUI defined button. Conveniently this can be the "Escape" key on a keyboard. It can also comprise a further mode of operation of a context sensitive user interface element, for example the button 250.

In embodiments that include a dedicated focus element, for example the embodiments described with reference to FIG. 5b, either or both of the focus element 251 or concatenator element 250 can act as the reversion element in the context in which the focused single media element is active.

As described in connection with FIG. 1, once located either in the single media element or focused single media element, the required media element can readily be inserted into one of the timelines 220 and 240, such as by dragging and dropping from the viewer window 210 or from graphical display object 260. The user interface 200 is configured to only insert into the timeline the individual media element currently being viewed in the viewer window 210, rather than inserting the entire single media element or the entire focused single media element.

Graphical display object 260 is configured to receive user input (such as a keyboard input, mouse click, or touchscreen display contact) and in response thereto, define start points and/or end points within the single media element or focused single media element while it is played in the viewer window 210. Any new clips that are defined in this way (namely by the definition of a start point and a corresponding end point) are automatically loaded into one or both of the timelines 220 and 240. In the graphical display object 260, a plurality of start points and/or end points can be defined to add multiple clips defined by pairs of start and end points into the timelines 220 and 240. Once the multiple clips are present in the timelines 220 and 240, the boundaries thereof can be suitably edited, such as by trimming and/or extending. This functionality allows use of the graphical display object 260 to create clips with approximate boundaries, which can then be refined using the editing tools of the timelines.

By presenting a concatenation of all the constituent media objects into a single media element and also enabling focusing of that single media element on a subset of media elements with common attributes, as defined by metadata for example, the user workflow can be improved. In addition to avoiding the need to load individual clips into the timeline, a user can selectively narrow the number of simultaneously visible clips to aid their navigation though the multitude of clips that can be present in complex projects.

The concatenation of a plurality of media elements into a single media element effectively removes the start and end points that the individual elements inherently defined prior to the concatenation operation. This opens up the possibility of creating new media elements (namely by defining start and end points in the created single media element) that contain content from more than one of the original source media elements. Transition effects can then be readily inserted between the newly-created media elements.

Embodiments of the present disclosure are also concerned with an advantageous playback methodology that is performed on the created single media element. According to the methodology, the playback speed of the single media element is varied by reference to the properties of the individual source media elements that comprise the single media elements. The methodology is implemented by retaining information about the properties of the source media elements (for example duration) after those elements have been concatenated into the single media element. The retained property information is then used to control the playback of the single media element.

One example of the playback methodology involves playing source media elements of a duration below a threshold value at their normal speed and playing source media elements of a duration above the threshold value at an increased speed. The increased playback speed can be the same irrespective of the durations of the requisite source media elements or can be varied in accordance with the individual durations of those source media elements.

Other playback-control methodologies can be defined using the present disclosure. For example, source media elements of a duration less than a threshold value can be ignored and the playback speed of the remaining elements varied. In other examples, a playback speed of the created media object at a given point may be determined by a function of the length of the source media element corresponding to that given point.

Figure 7:
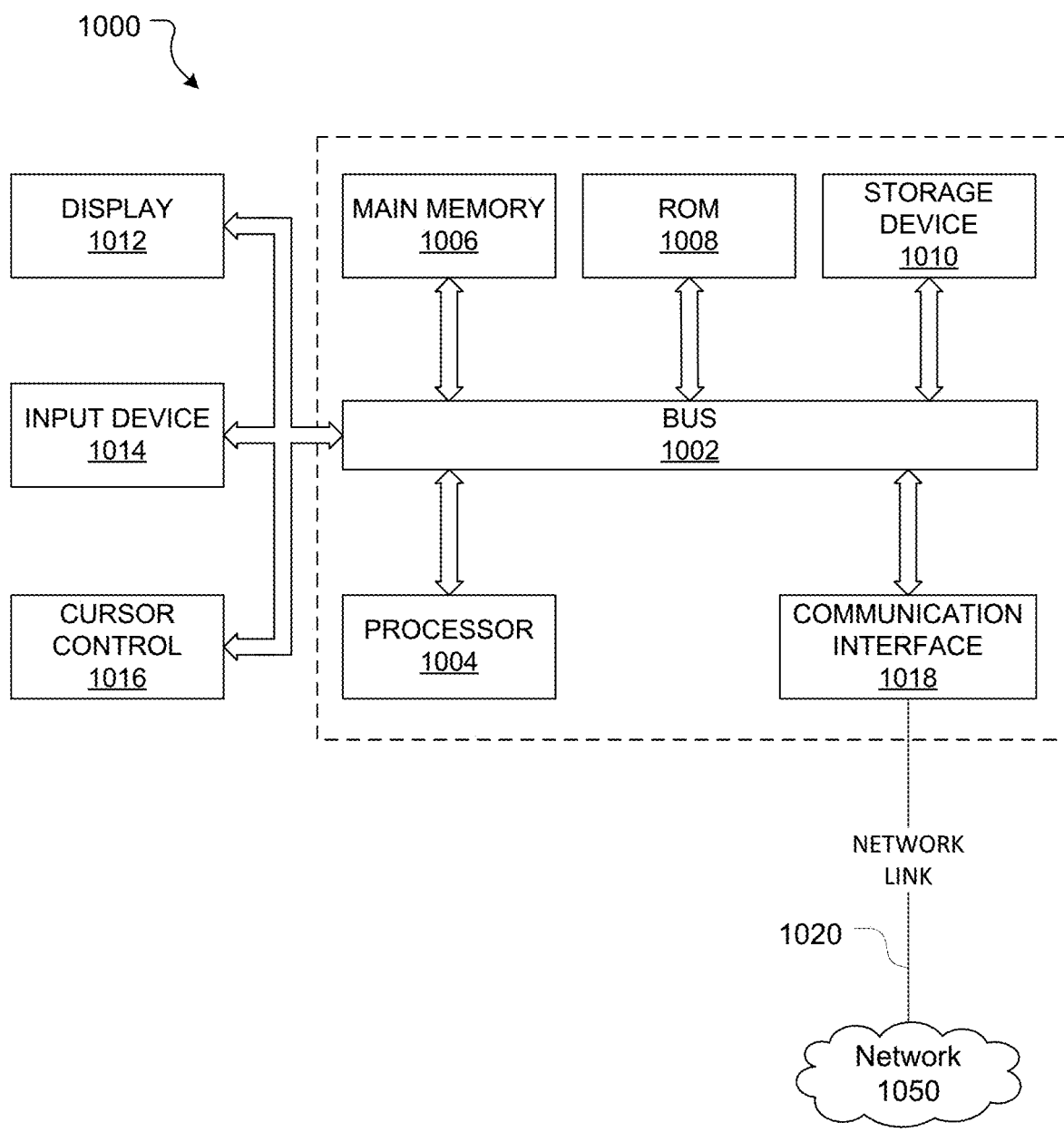
FIG. 7 is a schematic illustration of a hardware environment suitable for implementing the graphical user interface in accordance with an embodiment of the present disclosure.

FIG. 7 provides a block diagram that illustrates one example of a computer system 1000 upon which embodiments of the disclosure may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor, a graphics processing unit, other type of processing unit, or combinations thereof.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized and configured to perform the operations specified in the instructions.

Computer system 1000 may further include a read only memory (ROM) 1008 or other static storage device coupled to bus 1002 for storing static information and instructions for processor 1004. A storage device 1010, such as a magnetic disk or optical disk, may be provided and coupled to bus 1002 for storing information and instructions including the video editing software application described above.

The computer system 1000 may be coupled via bus 1002 to a display 1012 (such as an LCD, LED, touch screen display, or other display) for displaying information to a computer user, such as the graphical user interface described and illustrated above. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to at least one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1000 may also include a communication interface 1018 coupled to bus 1002. Communication interface 1018 provides a two-way data communication coupling to a network link 1020 that is connected to communication network 1050. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Figure 8:
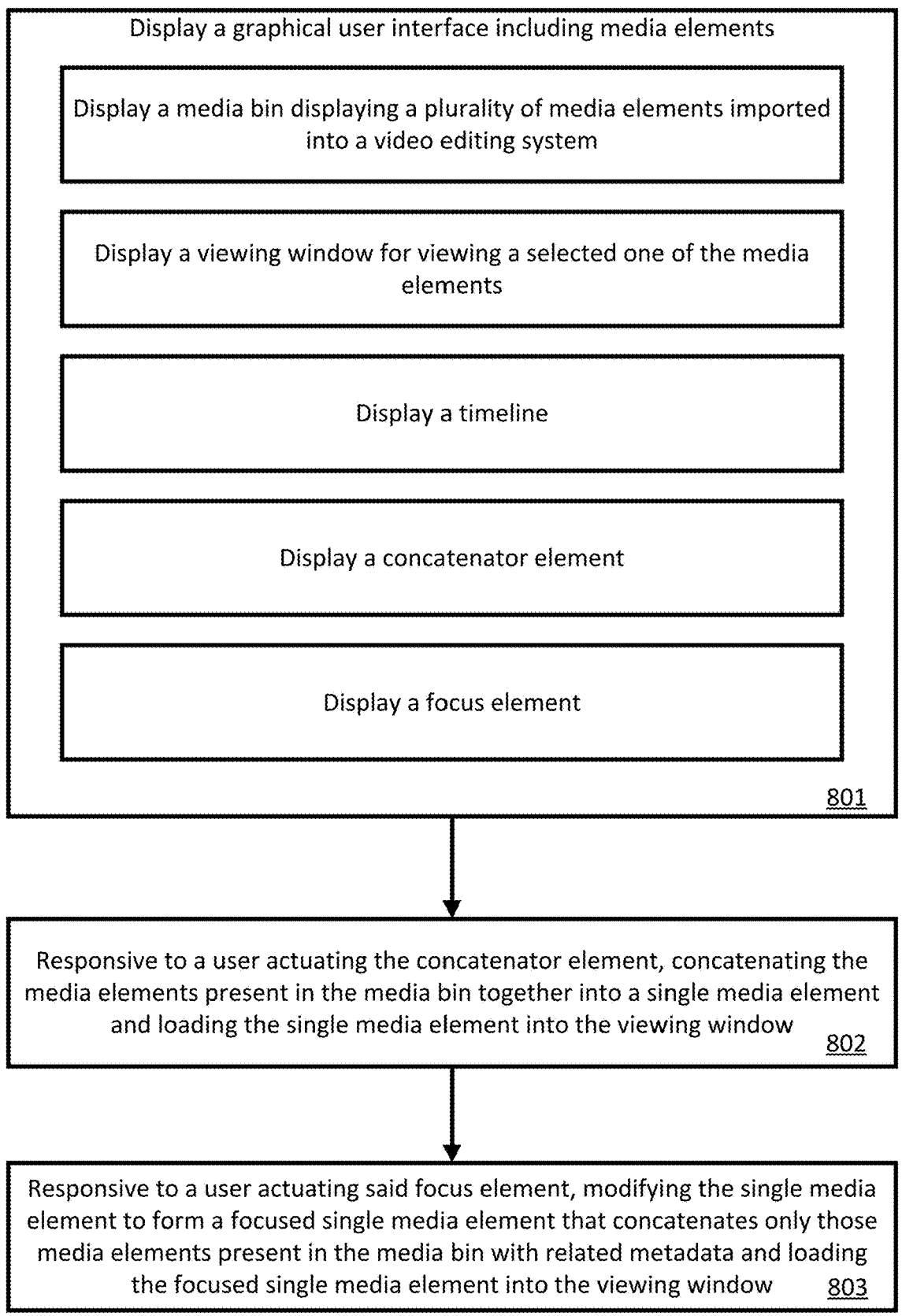
FIGS. 8 to 10 illustrate flow diagrams of example methods for providing a graphical user interface for a video editing system.

FIG. 8 illustrates a flow chart of a method 800 for providing a graphical user interface for a video editing system, for example the graphical user interface described with reference to FIGS. 2 to 6. In some embodiments the method 800 is implemented based on instructions in a non-transitory computer-readable medium, for example the ROM 1008.

In step 801, the method 800 includes displaying a graphical user interface including media elements. In some embodiments step 801 includes displaying a media bin displaying a plurality of media elements imported into the video editing system. In some embodiments step 801 includes displaying a viewing window for viewing a selected one of the media elements. In some embodiments step 801 includes displaying a timeline. In some embodiments step 801 includes displaying a concatenator element. In some embodiments step 801 includes displaying a focus element.

In step 802, the method 800 includes, responsive to a user actuating the concatenator element, concatenating the media elements present in the media bin together into a single media element and loading the single media element into the viewing window.

In step 803, the method 800 includes, responsive to a user actuating the focus element, modifying the single media element to form a focused single media element that concatenates only those media elements present in the media bin with related metadata and loading the focused single media element into the viewing window.

In some embodiments step 803 includes concatenating only those media elements present in the media bin that share attributes defined by the related metadata when the focus element is actuated. In some embodiments the related metadata includes common metadata, similar metadata, or metadata within a defined range of values.

In some embodiments the focused single media element concatenates only those media elements present in the media bin that share attributes defined by the one or a combination of predefined metadata fields corresponding to a currently-applied sorting scheme (e.g. see the method described with reference to FIG. 9).

In some embodiments the metadata is selected from: Timecode; Camera or camera type on which media was captured; Date; Time; Clip name; Scene; Shot; Clip color; Date modified; Date imported; and/or Bin.

In some embodiments the concatenator element and the focus element comprise different modes of operation of a context sensitive user interface element, for example the context sensitive user interface element operating as the concatenator element in a first context, and operating as the focus element in a second context. The method 800 may include entering the second context once the single media element has been formed by concatenation of the media elements present in the media bin. The context sensitive user interface element may operate as a reversion element in a third context, wherein reversion element reverses the operation of the focus element such that a single media element is again formed which concatenates the all of the media elements present in the media bin together into a single media element and loads the single media element into the viewing window.

Figure 9:
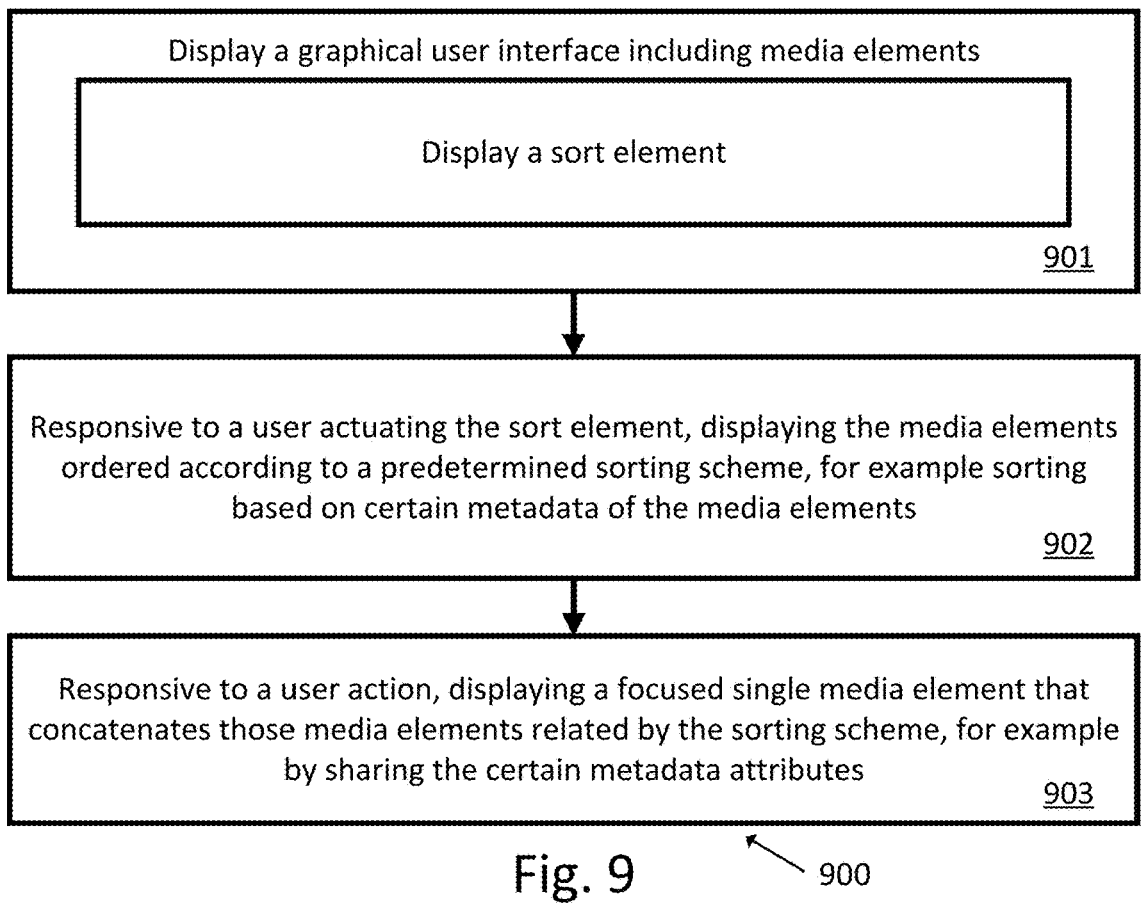

FIG. 9 illustrates a flow chart of a method 900 for providing a graphical user interface for a video editing system, for example the graphical user interface described with reference to FIGS. 2 to 6. In some embodiments the method 900 is performed in conjunction with the method 800. In some embodiments the method 900 is implemented based on instructions in a non-transitory computer-readable medium, for example the ROM 1008.

In step 901 the method 900 includes displaying a graphical user interface including media elements. Step 901 may include displaying a sort element, for example as described in relation to step 801. Step 901 may include displaying one or more other elements, for example the other elements described in step 801. In step 902, the method includes, responsive to a user actuating the sort element, displaying the media elements, which may be in a media bin, ordered according to a predetermined sorting scheme.

In some embodiments the predetermined sorting scheme is user defined or user selected. In some embodiments the predetermined sorting scheme comprises sorting the media elements according to one or a combination of predefined metadata fields.

In step 903, the method includes, responsive to a user action, displaying a focused single media element that concatenates those media elements related by the sorting scheme, for example by sharing metadata attributes used for sorting. In some embodiments step 903 is a part of step 803 in method 800.

Figure 10:
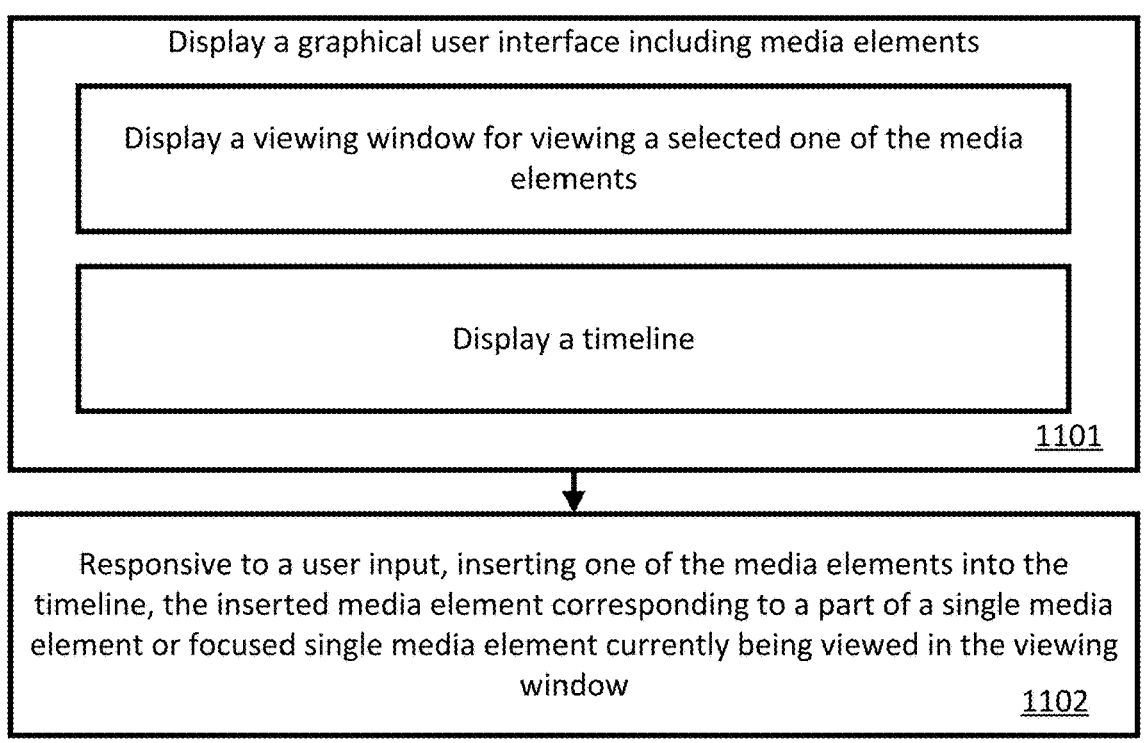

FIG. 10 illustrates a flow chart of a method 1100 for providing a graphical user interface for a video editing system, for example the graphical user interface described with reference to FIGS. 2 to 6. In some embodiments the method 1100 is performed in conjunction with the method 800 or the method 900. In some embodiments the method 1100 is implemented based on instructions in a non-transitory computer-readable medium, for example the ROM 1008.

In step 1101 the method 1100 includes displaying a graphical user interface including media elements. Step 1101 includes displaying a viewing window for viewing a selected one of the media elements and displaying a timeline. Step 1101 may include displaying one or more other elements, for example the other elements described in step 801 and/or step 901.

In step 1102, the method 1100 includes, responsive to a user input, inserting one of the media elements into the timeline. The media element inserted into the timeline is the media element that corresponds to the part of the single media element or focused single media element (see herein above) currently being viewed in the viewing window.

It will be understood that the invention disclosed and defined in this specification extends to all alternative combinations of two or more of the individual features mentioned or evident from the text or drawings. All of these different combinations constitute various alternative aspects of the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A software product including a non-transitory computer-readable medium storing instructions which, when executed by a processor, cause the processor to:
  display a graphical user interface for a video editing system, the graphical user interface including:
    a media bin displaying a plurality of media elements imported into the video editing system,
    a viewing window for viewing a selected one of the plurality of media elements,
    a timeline,
    a concatenator element, and
    a focus element;
  receive a user input actuating the concatenator element;
  responsive to the user input actuating the concatenator element, concatenate the media elements present in the media bin together into a single media element and loads the single media element into the viewing window;
  receive a user input actuating the focus element; and
  responsive to the user input actuating the focus element, modify the single media element to form a focused single media element that concatenates only those media elements present in the media bin with related metadata and loads the focused single media element into the viewing window,
  wherein the concatenator element and the focus element comprise different modes of operation of a context sensitive user interface element, and wherein the context sensitive user interface element operates as the concatenator element in a first context, and operates as the focus element in a second context.

2. The software product as claimed in claim 1 wherein the graphical user interface further includes a sort element and the instructions, when executed by the processor, cause the processor to:
receive a user input actuating the sort element, and
responsive to the user input actuating the sort element, display the media elements in the media bin according to a predetermined sorting scheme.

3. The software product as claimed in claim 2 wherein the predetermined sorting scheme comprises sorting the media elements according to one or a combination of predefined metadata fields.

4. The software product as claimed in claim 1 wherein the focused single media element comprises a concatenation of only those media elements present in the media bin that share attributes defined by related metadata.

5. The software product as claimed in claim 1 wherein the focused single media element comprises a concatenation of only those media elements present in the media bin that share attributes defined by the one or a combination of predefined metadata fields corresponding to a currently-applied sorting scheme.

6. The software product as claimed in claim 1 wherein the focused single media element comprises a concatenation of only those media elements present in the media bin that share related metadata with a selected one of the media elements displayed in the viewing window.

7. A method for providing a graphical user interface for a video editing system, the method comprising:
displaying the graphical user interface including: a media bin displaying a plurality of media elements imported into the video editing system, a viewing window for viewing a selected one of the plurality of media elements, a timeline, a concatenator element, and a focus element;
receiving a user input actuating the concatenator element;
responsive to the user input actuating the concatenator element, concatenating the media elements present in the media bin together into a single media element and loading the single media element into the viewing window;
receiving a user input actuating the focus element; and
responsive to the user input actuating said focus element, modifying the single media element to form a focused single media element that concatenates only those media elements present in the media bin with related metadata and loading the focused single media element into the viewing window,
wherein the concatenator element and the focus element comprise different modes of operation of a context sensitive user interface element, and
wherein the context sensitive user interface element operates as the concatenator element in a first context, and operates as the focus element in a second context.

8. The method as claimed in claim 7 wherein the graphical user interface further includes a sort element, and the method further includes:
receiving a user input actuating the sort element; and
responsive to the user input actuating said sort element, displaying the media elements in the media bin ordered according to a predetermined sorting scheme.

9. The method as claimed in claim 8 wherein the predetermined sorting scheme comprises sorting the media elements according to one or a combination of predefined metadata fields.

10. The method as claimed in claim 7 which further includes concatenating only those media elements present in the media bin that share attributes defined by the related metadata when the focus element is actuated.

11. The method as claimed in claim 7 wherein the focused single media element comprises a concatenation of concatenates only those media elements present in the media bin that share attributes defined by the one or a combination of predefined metadata fields corresponding to a currently-applied sorting scheme.

12. The method as claimed in claim 7 wherein the focused single media element comprises a concatenation of only those media elements present in the media bin that share related metadata with a selected one of the media elements displayed in the viewing window.

13. A computer system including a processor and non-transitory storage media storing one or more sequences of instructions that are accessible to the processor, wherein the one or more instructions, when executed by said processor, cause the computer system to:
display, on a display, a graphical user interface including:
a media bin displaying a plurality of media elements imported into the video editing system, a viewing window for viewing a selected one of the media elements, a timeline, a concatenator element, and a focus element;
receiving a user input actuating the concatenator element;
responsive to receipt of the user input actuating the concatenator element, concatenate the media elements present in the media bin together into a single media element and load the single media element into the viewing window; and
receiving a user input actuating the focus element;
responsive to receipt of the user input actuating the focus element, modify the single media element to form a focused single media element that is a concatenation of only those media elements present in the media bin with related metadata and load the focused single media element into the viewing window,
wherein the concatenator element and the focus element comprise different modes of operation of a context sensitive user interface element, and
wherein the context sensitive user interface element operates as the concatenator element in a first context, and operates as the focus element in a second context.

14. The computer system as claimed in claim 13 wherein the focused single media element comprises a concatenation of only those media elements present in the media bin that share related metadata with a selected one of the media elements displayed in the viewing window.

* * * * *